(12) United States Patent
Smith, Jr. et al.

(10) Patent No.: US 6,866,009 B2
(45) Date of Patent: Mar. 15, 2005

(54) COLLAPSIBLE ANIMAL CONTAINER

(75) Inventors: Duane M. Smith, Jr., Mayer, MN (US); William Lloyd Sletten, Brooklyn Park, MN (US)

(73) Assignee: Miller Manufacturing Company, Eagan, MN (US)

( * ) Notice: Subject to any disclaimer, the term of this patent is extended or adjusted under 35 U.S.C. 154(b) by 0 days.

(21) Appl. No.: 10/322,877

(22) Filed: Dec. 18, 2002

(65) Prior Publication Data

US 2003/0127059 A1 Jul. 10, 2003

Related U.S. Application Data

(63) Continuation-in-part of application No. 10/041,927, filed on Jan. 7, 2002, now Pat. No. 6,526,919.

(51) Int. Cl.[7] ................................................ A01K 1/00
(52) U.S. Cl. ........................................................ 119/840
(58) Field of Search .............................. 119/431, 452, 119/453, 455, 461, 472–474, 491, 492, 496, 498

(56) References Cited

U.S. PATENT DOCUMENTS

| | | | |
|---|---|---|---|
| 2,079,458 A | | 5/1937 | Leichtfuss |
| 3,023,732 A | * | 3/1962 | Richard ...................... 119/498 |
| 3,048,147 A | | 8/1962 | McKean |
| 3,195,506 A | | 7/1965 | Beard |
| 3,604,590 A | * | 9/1971 | Jenkins ....................... 220/668 |
| D254,631 S | | 4/1980 | Albright |
| 4,590,885 A | | 5/1986 | Sugiura |
| 4,793,286 A | * | 12/1988 | Buxton ...................... 119/498 |
| 4,803,951 A | * | 2/1989 | Davis ......................... 119/497 |
| 5,016,570 A | | 5/1991 | Henson |
| 5,078,096 A | | 1/1992 | Bishop et al. |
| 5,170,745 A | | 12/1992 | Burdette, Jr. |
| 5,577,465 A | * | 11/1996 | Cook .......................... 119/498 |
| 5,669,331 A | | 9/1997 | Richmond |
| 5,671,698 A | | 9/1997 | Farrugia |
| 5,701,705 A | * | 12/1997 | Davis et al. ................... 52/68 |
| 5,839,392 A | | 11/1998 | Pemberton et al. |
| 5,881,678 A | | 3/1999 | Morley |
| 5,931,120 A | | 8/1999 | Burns et al. |
| 6,021,740 A | * | 2/2000 | Martz ......................... 119/497 |
| D423,147 S | | 4/2000 | Farrugia |
| 6,073,587 A | * | 6/2000 | Hill et al. .................... 119/474 |
| 6,076,485 A | | 6/2000 | Peeples et al. |
| 6,082,305 A | | 7/2000 | Burns et al. |
| 6,092,488 A | | 7/2000 | Allawas |
| 6,095,090 A | | 8/2000 | Burns et al. |
| 6,155,206 A | * | 12/2000 | Godshaw ..................... 119/453 |
| 6,216,637 B1 | | 4/2001 | Burns et al. |
| D444,271 S | | 6/2001 | Farrugia |
| 6,286,461 B1 | | 9/2001 | Martz |
| 6,286,462 B1 | | 9/2001 | Burns |
| 6,308,661 B2 | | 10/2001 | Burns et al. |
| 6,394,036 B2 | | 5/2002 | Burns et al. |
| 6,516,751 B2 | | 2/2003 | Burns et al. |

OTHER PUBLICATIONS

Web page printout of DrsfosterSmith.com dated May 3, 2001.
Web page printout of metrolineproducts.com dated Jun. 14, 2001.

* cited by examiner

Primary Examiner—Thomas Price
(74) Attorney, Agent, or Firm—Merchant & Gould P.C.

(57) ABSTRACT

A collapsible animal container 10 having a lightweight construction is disclosed. The animal container 10 is constructed of a flexible housing 12 suspended by rigid panels 14 separated by struts 16. The housing 12 includes a top wall, bottom wall, a pair of end walls and a pair of side walls. One or more struts 16 are provided and are biased between the rigid panels 14 to maintain the animal container 10 in an open and usable configuration. When removed, the struts 16 may be stored in pockets 20 formed in the side walls to simplify transport. A strap 36 and/or leash may also be provided to bundle the rigid panels 14 together when not in use or for transport. A handle 18 may also be incorporated into the animal container 10 or strap 36, particularly, to further simplify transport.

7 Claims, 11 Drawing Sheets

COLLAPSIBLE ANIMAL CONTAINER

CROSS-REFERENCE TO RELATED APPLICATION(S)

This is a continuation-in-part of U.S. patent application Ser. No. 10/041,927, filed Jan. 7, 2002, now U.S. Pat. No. 6,526,919. Priority of this prior application is claimed under 35 U.S.C. §120.

BACKGROUND OF THE INVENTION

The present invention relates to animal containers and, more particularly, to animal containers that are portable and collapsible.

A variety of animal containers are currently available. Generally, the containers are designed to be strong enough to confine an animal and light enough so that they can be easily handled. To make the containers even easier to handle, some containers are also collapsible. The collapsibility reduces the volume of the container making the container easier to store and transport.

The collapsible containers are available in a variety of configurations. Some collapsible containers have rigid hinged collapsible walls which give the appearance of a suitcase when folded. However, these containers tend to be heavy and overly complex. Their weight makes these containers cumbersome to handle and their complexity invites component failure and increases manufacturing costs. Still other containers have a rigid telescoping design that is typically less complicated than the hinged collapsible containers. However, the telescoping rigid containers typically do not collapse as efficiently as the hinged designs and, therefore, take up a substantial volume even when collapsed. Further, the telescoping rigid containers are still relatively heavy.

Other lighter weight containers have flexible housings supported by a collapsible internal aluminum framing. The aluminum framing is provided with hinges and hinged foldable cross braces to allow the structure's collapse. Although this hinged design is relatively light, the aluminum framing is complex and the plurality of hinges and cross-braces invite component failure. The complexity adds to the time for manufacture and decreases the acceptable tolerances during manufacture, thus increasing manufacturing costs. The hinging of components alone makes the framing more expensive to manufacture and invites component failure. The hinged cross-braces may also be difficult to bend into an unlocked configuration permitting collapse, frustrating a user. Further, the forces required to collapse the container can create excessive wear and fatigue components of the framing resulting in a housing that is not taut or even leading to component failure, either of which lead to increased customer dissatisfaction. The internal hinged aluminum frame design is also relatively expensive to design and manufacture. Therefore, a need exists for a container having a strong, lightweight and simple construction allowing for efficient manufacture.

In addition, portable animal containers are frequently transported adjacent the rear hatch in sport utility vehicles. The hatch on sport utility vehicles typically has an angle to the floor of less than 90 degrees and, typically, the ends of animal containers are perpendicular to the floor. Therefore, a space is created between the animal container and the door when the top of the animal container abuts the hatch. This loss of space is amplified when transporting multiple containers. Therefore, a need exists for a container which has one or more angled ends to conform to the angle of the rear hatch and provide the maximum possible interior space for the animal within the container while most effectively utilizing the space available.

The present invention meets the above needs and provides additional improvements and advantages that will be recognized by those skilled in the art upon review of the following specification and figures.

BRIEF SUMMARY OF THE INVENTION

The present invention provides a lightweight animal container that can easily be collapsed to a reduced size. The rigid side walls supporting the housing increase the strength and durability of the design. The present invention also provides a design with one or more angled walls to conform to the rear hatch or rear seatbacks of a vehicle. Further, the present invention can provide a storage pocket for holding struts and other items, and can include various windows or openings to allow ventilation and/or access to the animal.

In one aspect of the present invention, the invention is a collapsible animal container comprising a housing, a pair of opposing rigid panels and at least one strut. The housing is formed, at least in part, of flexible material and includes a top wall, a bottom wall, a pair of end walls, and a pair of side walls. The housing can include one or more windows in one or more of the side walls and/or end wall. The windows can be made of a mesh material, a clear plastic or other material that will be recognized by those skilled in the art. Further, the flexible collapsible animal container may include a door in one of the end walls and/or side walls. The door can be made of a mesh material. A pair of rigid panels may be positioned within or are integral with the housing or, alternatively, a pair of peripheral frames may be positioned within or are integral with the housing. The rigid panels are collapsible toward one another and are maintained in a separated position by the at least one strut to support the housing. The rigid panels may be integral with the housing. Alternatively, the pair of rigid panels can function as the pair of side walls, the pair of end walls, or the combination of top wall and bottom wall. The struts can be a releasable strut and a collapsible strut. The struts can include a rod having an end cap secured to the rod at a first end of the rod and a hinge secured to the rod at a second end of the rod, the hinge attached to at least one of a rigid panel and a wall to allow the rod to pivot. The end cap can be a rubber cap, telescoping end cap or a extendable threaded end cap. One or more strut braces can be provided and secured to the housing to secure the strut. The struts can include a rod having end caps secured to each end of the rod. The rod may be a spring-loaded telescoping rod. The end cap can be a telescoping end cap or a extendable threaded end cap.

In another aspect of the invention, the collapsible animal container may have at least one side wall or end wall at an acute angle to the bottom wall.

DETAILED DESCRIPTION

Figure 1:
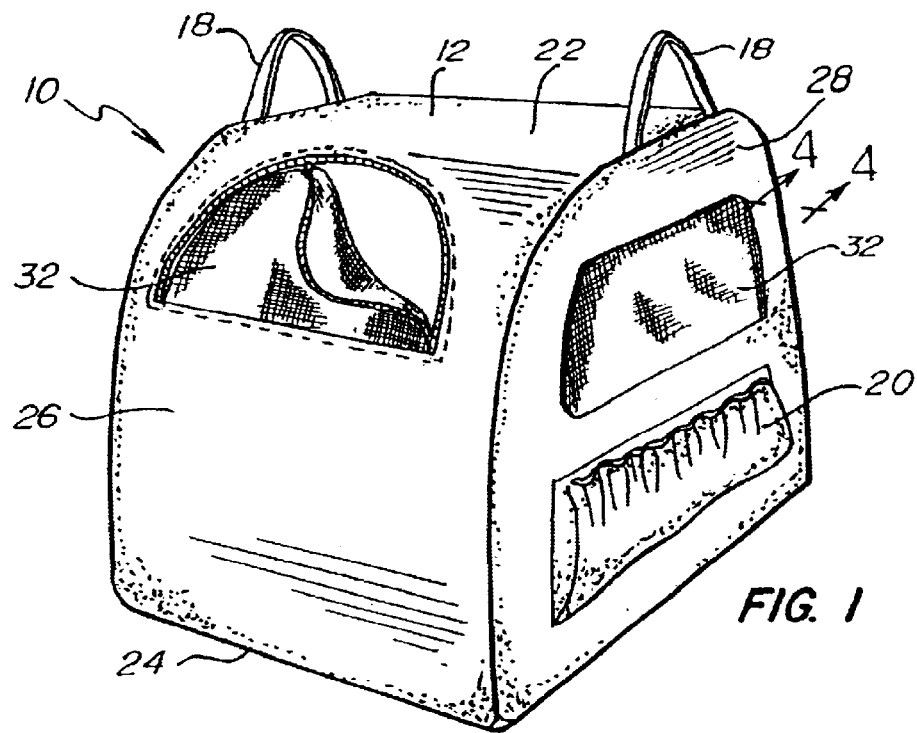
FIG. 1 is a perspective view of an end of an embodiment of an animal container in accordance with the present invention in an open configuration.

The present invention is generally described in the context of the embodiments shown in the figures. The appended claims are not intended to be limited to these embodiments. That is, the described embodiments are considered in all respects as illustrative, not restrictive. The present invention may be embodied in other specifications and may be otherwise altered without departing from the scope of the appended claims. Further, in the drawings described below, the reference numerals are generally repeated where identical elements or analogous elements appear in more than one figure.

Figure 2:
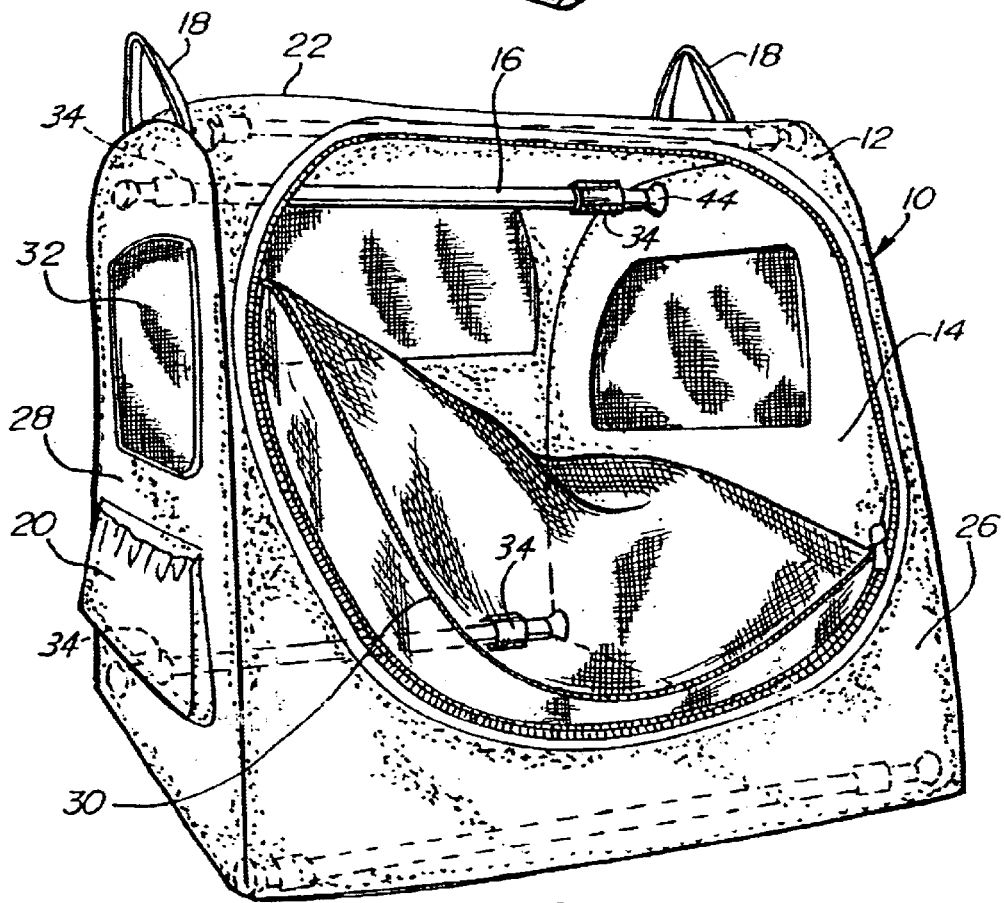
FIG. 2 is a perspective view of the other end of the embodiment of the animal container of FIG. 1 including a door and showing the internal placement of the struts.
Figure 3:
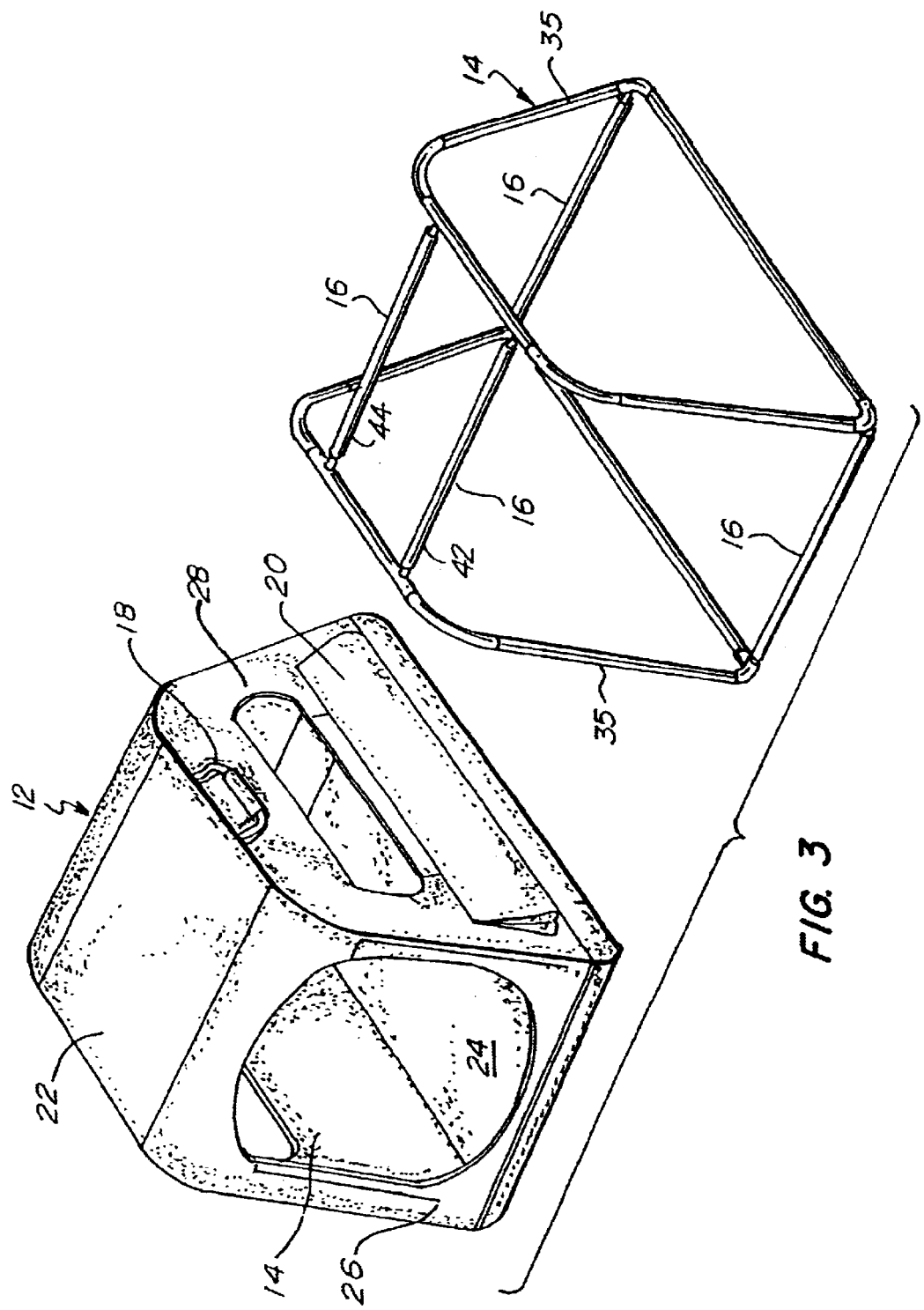
FIG. 3 is an exploded perspective view of another embodiment of an animal carrier in accordance with the present invention.

FIGS. 1, 2 and 3 illustrate embodiments of an animal container 10 in accordance with the present invention. Animal container 10 includes a housing 12, a pair of opposing support elements 14, and one or more struts 16. Housing 12 is, at least in part, constructed of a flexible material. Opposing support elements 14, at least in part, support housing 12 by being positioned adjacent opposing walls within housing 12 and biased apart and against housing 12 with one or more struts 16.

Housing 12 generally includes a top wall 22, a bottom wall 24, a pair of end walls 26 and a pair of side walls 28 configured to confine an animal. The walls are shaped so that when joined to form housing 12, the shape of housing 12 allows the housing to confine an animal. The trapezoidal shape of housing 12 generally illustrated throughout the figures is shown for exemplary purposes only. Housing 12 is, at least in part, constructed of a flexible material to permit the collapse of animal container 10. The material of housing 12 can be flexible plastic, a nylon or other synthetic fabric, cotton or other natural fiber fabric, or other material that will be recognized by those skilled in the art. Housing 12 can be formed from the material by securing adjacent walls at their edges by stitching, welding or by other method that will be recognized by those skilled in the art or the adjacent walls may be formed from a continuous piece of material. In one form, housing 12 is constructed to allow opposing walls including support elements 14 to collapse toward one another when struts 16 are removed.

Figure 5:
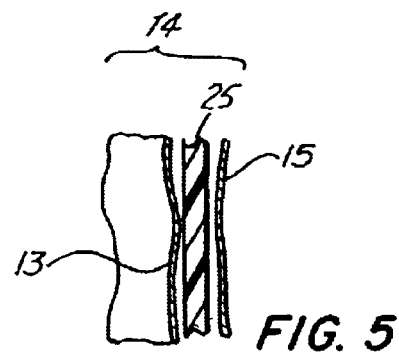
FIG. 5 is a partial cross-section of an embodiment of a side wall including a rigid panel.

Support elements 14 may be a panel 25, as shown in FIGS. 2 and 5, may be a peripheral frame 35, as shown in FIG. 3, or may be in another form designed to support opposing walls of housing 12 when biased against the opposing walls with struts 16. Generally, support elements 14 are shaped to support the walls which support elements 14 abut. In one form, support element 14 has the same peripheral shape as the wall which the particular support element abuts. That is, for example, if the wall against which support element 14 is placed is a trapezoid, then support element 14 is shaped as a trapezoid, or if the wall against which support element 14 is placed is a square, then support element 14 is shaped as a square.

Opposing support elements 14 can simply be positioned within housing 12, can be secured adjacent to a wall within housing 12, can be integral with a wall of housing 12, or can be integral with the material of housing 12. In the embodiment of FIG. 5, support element 14, shown as panel 25 for exemplary purposes, is secured between an inner layer of flexible material 13 and outer layer of flexible material 15 of a side wall 28 having multiple layers for exemplary purposes. In other embodiments, the corners of support element 14 can be held in position by interior pockets formed in the corresponding corners of the particular wall that the support element is configured to abut or can be held in position by hook and loop type fasteners within housing 12. Alternatively, support elements 14 may be simply positioned adjacent the top wall and bottom wall, side walls, or end walls; may be integral with the top wall and bottom wall, side walls, or end walls in a manner other than that shown in FIG. 5; or may, when in the form of panels 25, themselves function as the top wall and bottom wall, side walls, or end walls of housing 12.

Panels 25 are typically constructed from a lightweight rigid material, such as nylon, aluminum, plastic, carbon fiber, wood, fiber board or other rigid materials which will be recognized by those skilled in the art upon review of the present disclosure. As generally discussed above, panels 25 are generally shaped to conform to the wall against which each panel 25 is positioned including possible cutouts for windows and doors. The cutouts for windows and doors aligning with the analogous structures on housing 12.

As shown in FIG. 3, peripheral frames 35 are typically constructed of tubes, bars or other elements that may be constructed into a frame. The elements of peripheral frame 35 are typically formed from lightweight rigid material. These materials can include aluminum, nylon, plastic, carbon fiber, wood or other rigid materials or structures which will be recognized by those skilled in the art upon review of the present disclosure. As generally discussed above, frames 35 are generally shaped to conform to the wall against which each frame 35 is positioned.

Support elements 14 are maintained in a separated position within the housing by one or more struts 16. As shown in FIG. 2, in one embodiment struts 16 are biased between support elements 14 to pull the flexible material of the housing 12 taut and, thereby, at least in part, support the housing. Struts 16 may function only to maintain the separation of rigid panels 25 or may themselves supplement the supporting function of support elements 14 by being positioned adjacent a wall of housing 12 that does not include a support element 14. Struts 16 are typically biased between opposing support elements 14 such that the longitudinal axis of strut 16 is generally parallel to the plane of the adjacent wall or, when positioned in a corner, to the planes of the two adjacent walls.

Struts 16, as shown in FIGS. 2, 3, 4, 6, 7, and 8, typically comprise a rod 42 having end caps 44 on each end. One or both of end caps 44 may be attached to the rod with a threaded design, spring-loaded design, or other design to allow the adjustment of the length of the strut. The adjustable length better facilitates insertion and removal of strut 16 within housing 12, and compensates for the stretching of the housing material over time and subtle variations in size inherent in the manufacture of both struts 16 and housing 12.

Figure 7:
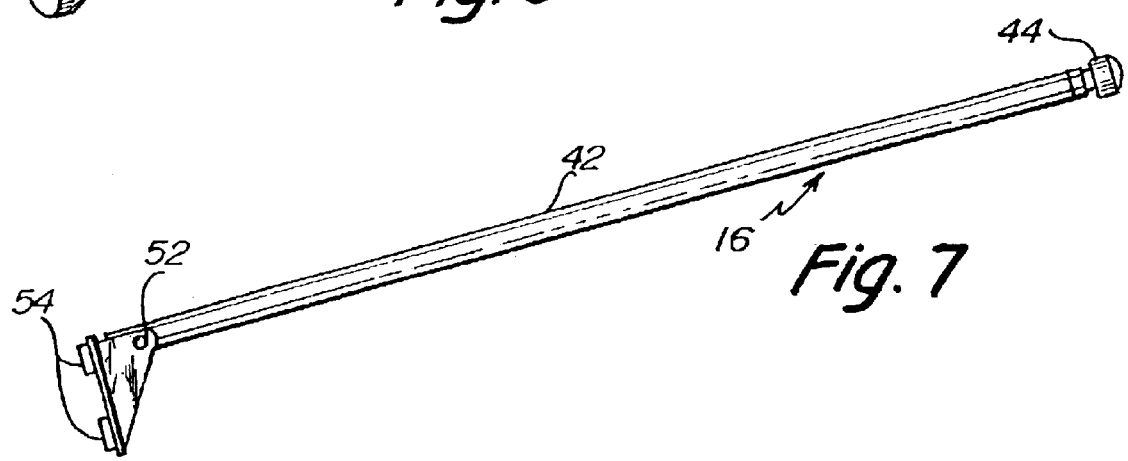
FIG. 7 is an embodiment of a strut having a hinge.

End caps 44 may be formed in various configurations depending on the nature and configuration of the support element 14 that the end caps 44 contact. End caps 44 may be positioned on one or both ends of rod 42 and may be threadedly attached to rod 42 to permit adjustment of the length of strut 16, as shown in FIG. 7. End caps 44 are typically formed from compressible elastic materials, such as rubber for example. When contacting a support element 14 in the form of a panel 25, end caps 44 are typically configured to provide a flat contact point to maximize the contact area with the generally flat panel 25. Alternatively, end caps 44 for contact with panels 25 may be configured in any of a variety of forms, such as having pointed end or rounded ends for example, to maximize the securing function of end cap 44 and/or most easily permit the placement of strut 16 at the desired location within housing 12. When contacting a support element 14 in the form of a peripheral frame 35, end caps 44 are generally configured to maintain strut 16 on peripheral frame 35. In one exemplary form, end cap 44 may have a conical tip to fit within a depression or hole within peripheral frame 35 such that strut 16 is compressionally secured at a position on peripheral frame 35. In another exemplary form, end cap 44 may have a groove shaped end to receive an interior portion of peripheral frame 35 such that strut 16 is compressionally secured to peripheral frame 35. In yet another exemplary form, end cap 44 may be constructed of a resilient material, such as for example nylon, in the form of a C-shaped fitting. The C-shaped fitting is compressionally secured or "snapped" over peripheral frame 35 to secure strut 16 to peripheral frame 35. The C-shaped fitting is further configured to allow strut 16 to exert a force to bias opposing peripheral frame 35 against their respective walls within housing 12.

When using a rigid rod 42, end caps 44 are compressed and/or rigid rod 42 is flexed to position struts 16 between support elements 14 to maintain housing 12 in an open position. In another form, struts 16 may be of a telescoping design being maintained in an extended position by a spring or other resilient element. When of a telescoping design, strut 16 is compressed to reduce the length of strut 16 to permit the strut to be positioned between the rigid panels. Strut 16 is then released to bias opposing support elements 14 apart. In yet another form, a strut 16, as shown in FIG. 7, may be pivotally fastened to one of the rigid panels 14. A hinge 52 allows strut 16 to be positioned parallel to the rigid panel 14 and/or wall to which hinge 52 is attached so that support elements 14 may be brought together and the housing 12 collapsed or positioned perpendicular to support elements 14 and/or wall of housing 12 to which hinge 52 is attached so that strut 16 and/or end cap 44 is biased against the opposing rigid panel 14. As shown in FIG. 7, hinge 52 can be removably attached to the wall and/or support element 14 such as by snap-type fasteners 54 or other releasable fasteners as will be recognized by those skilled in the art. In yet other forms, struts 16 may be flexible, releasable or collapsible to better facilitate installation and removal of strut 16 as will be recognized by those skilled in the art upon review of this disclosure.

Figure 4:
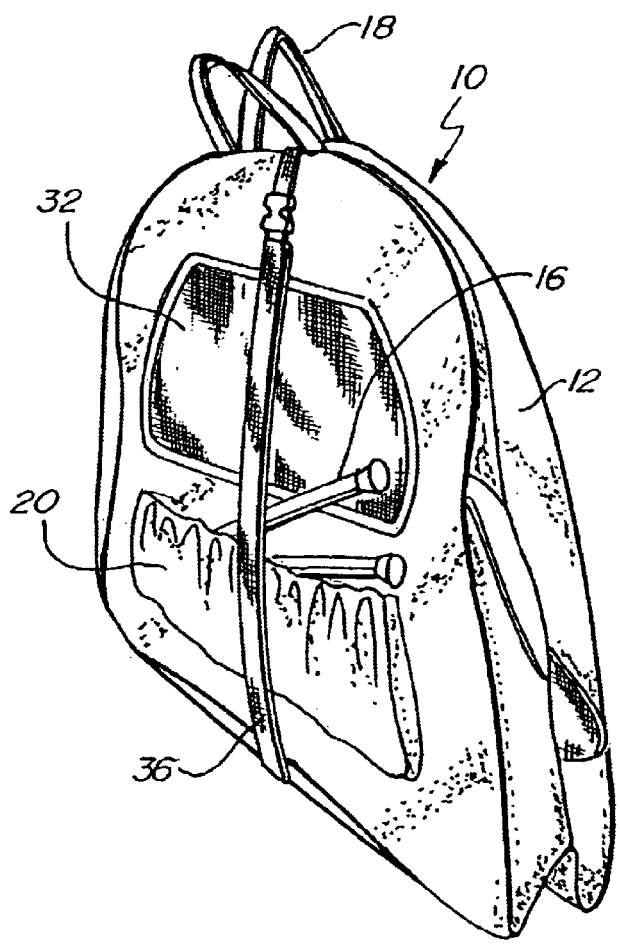
FIG. 4 is a perspective view of the embodiment of the animal container of FIGS. 1 and 2 in a collapsed configuration.
Figure 8:
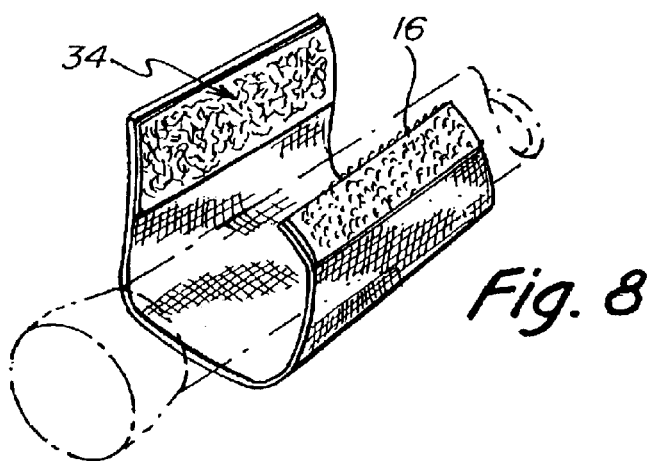
FIG. 8 is an embodiment of a strut brace and a strut.
Figure 6:
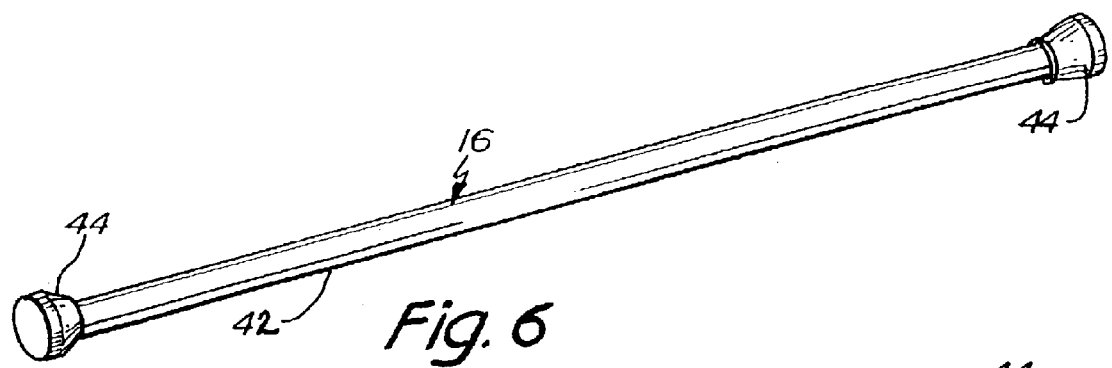
FIG. 6 is an embodiment of a strut.

One or more strut braces 34, as shown in FIGS. 2 and 8, may also be provided to further secure struts 16 at a desired location between support element 14. Strut braces 34 may include a hook and loop type fastener, buttons, snaps, straps for tying, or other brace that will be recognized by those skilled in the art upon review of this disclosure. With struts 16 installed, as shown in FIGS. 1 and 2, opposing support element 14 support housing 12 in an open configuration. Further, end walls 26 and/or side walls 28 may be configured so that in an open configuration the end walls or side walls may be at an acute angle to bottom wall 24. The acute angle allows animal container 10 to better conform to the interior walls of a vehicle transporting the container. With struts removed, as shown in FIG. 4, support elements 14 may be brought together to allow the top wall, bottom wall, and the pair of end panels to collapse for ease of storing animal container 10.

As shown in FIGS. 2 and 3, to facilitate introduction and removal of the animal, housing 12 is typically provided with a door 30. Door 30 may be permanently or removably attached to housing 12. Door 30 is typically constructed of a woven mesh material to allow the ventilation of animal container 10 and observation of an animal within the container. Alternatively, door 30 may be constructed of a solid clear or opaque material. In addition, animal container 10 may be provided with one or more windows 32. Windows 32 can also be either permanently or removably attached to housing 12. Windows 32 allow for better observation of the interior of the container and allow for cross-ventilation of the container. Thus, windows 32 are also typically constructed of a woven mesh material. Alternatively, windows 32 may be constructed of a solid clear or opaque material. Door 30 and windows 32 may be provided with a snap, strap, zipper, peelable fastener or other fastener to permit door 30 and/or windows 32 in an open configuration or, alternatively, to be secured in a closed configuration.

Housing 12 can be provided with a set of feet and/or legs on the bottom surface to prevent animal container 10 from sliding on the surface on which the animal container is placed. In addition, housing 12 may also be provided with one or more handles 18 to provide a convenient point to hold for the container in either or both of the open and collapsed configurations. One or more storage elements 20, such as pockets or sleeves, may also be provided on a wall of the container 10. Storage element 20 is shown as a pocket on side wall 28 for exemplary purposes only. Storage element 20 may be used for the hold struts 16 when the animal container is in the collapsed position, as shown in FIG. 4. A strap 36 may also be provided to secure the rigid walls adjacent one another for storage and transport in the collapsed configuration. In one embodiment, strap 36 can also function as a leash.

Figure 9:
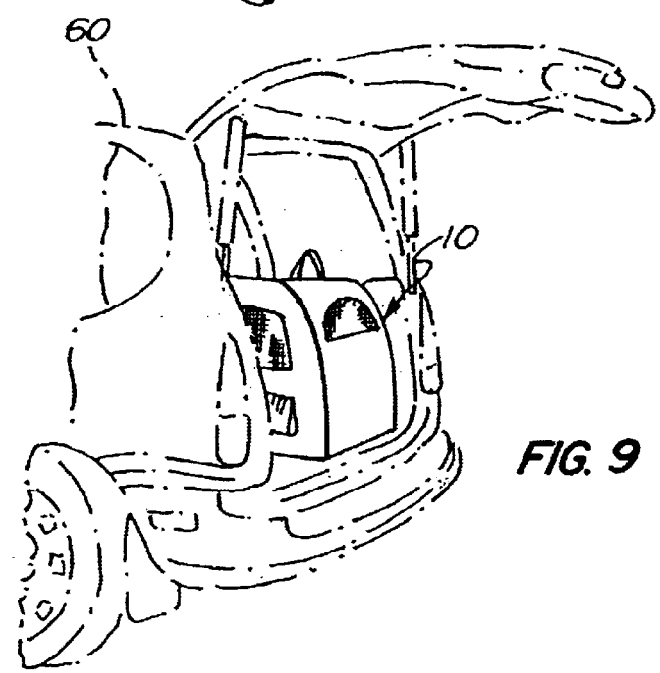
FIG. 9 is an embodiment of an animal container in accordance with the present invention fitted within a vehicle.

FIG. 9 shows an exemplary placement of an animal container 10 within the cargo area of a vehicle 60. In use, animal container 10 may be positioned within the cargo area of vehicle 60. With animal container 10 in an open configuration, an animal is inserted into the container through door 30. Door 30 is then secured and the hatch to the vehicle is closed. During transport either windows 32 or door 30 may be used to gain access to the animal for providing food or water and for removing waste.

Figure 10:
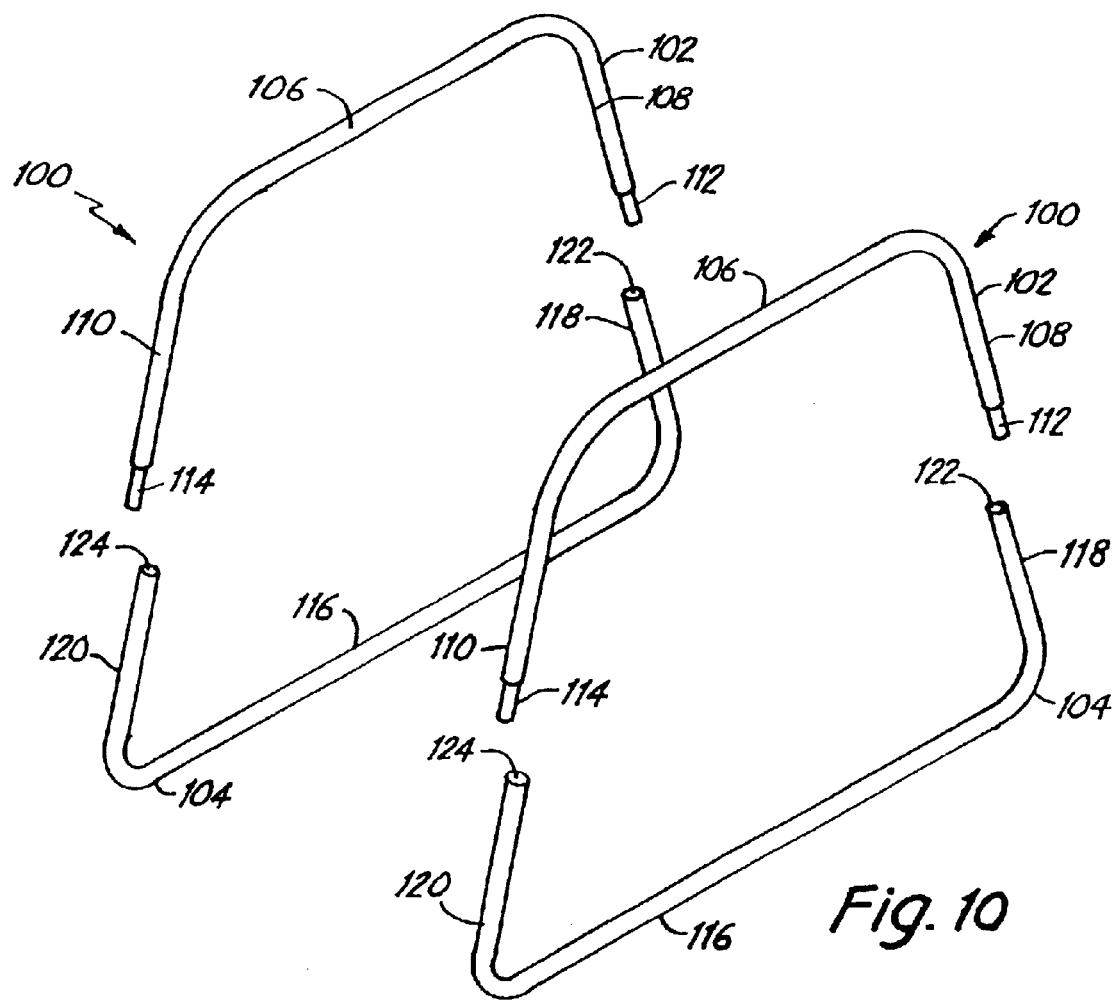
FIG. 10 is a perspective view of an alternative embodiment of peripheral frame members for the animal container of the present invention.

FIG. 10 is a perspective view of an alternative embodiment of a pair peripheral frame members 100 for use within an animal container 10. Each peripheral frame member 100 comprises a first section 102 and a second section 104; each section 102, 104 generally having a U-shape. In one embodiment, the first section 102 is a single piece of tubular metal that is bent at an angle to form an elongated center section 106 with two transverse end sections 108, 110. Transverse end section 108 has a terminal end portion 112, which has a reduced outer diameter as compared to the outer diameter of the first transverse end section 108. The second transverse end section 110 also has a terminal end portion 114, which has a reduced outer diameter as compared to the outer diameter of the second transverse section 110.

The second section 104 of peripheral frame member 100 is also a single piece of tubular metal that is bent to form an elongated center section 116 with two transverse end sections 118, 120. The width of end sections 108, 110 of the first section 102 is equivalent to the width of sections 118, 120. The diameter of the terminal end portions 112, 114 is selected to permit them to be slidably received within the hollow ends 122, 124 of the first and second transverse end sections 118, 120 and to form a friction fit between sections 102 and 104.

Figure 11:
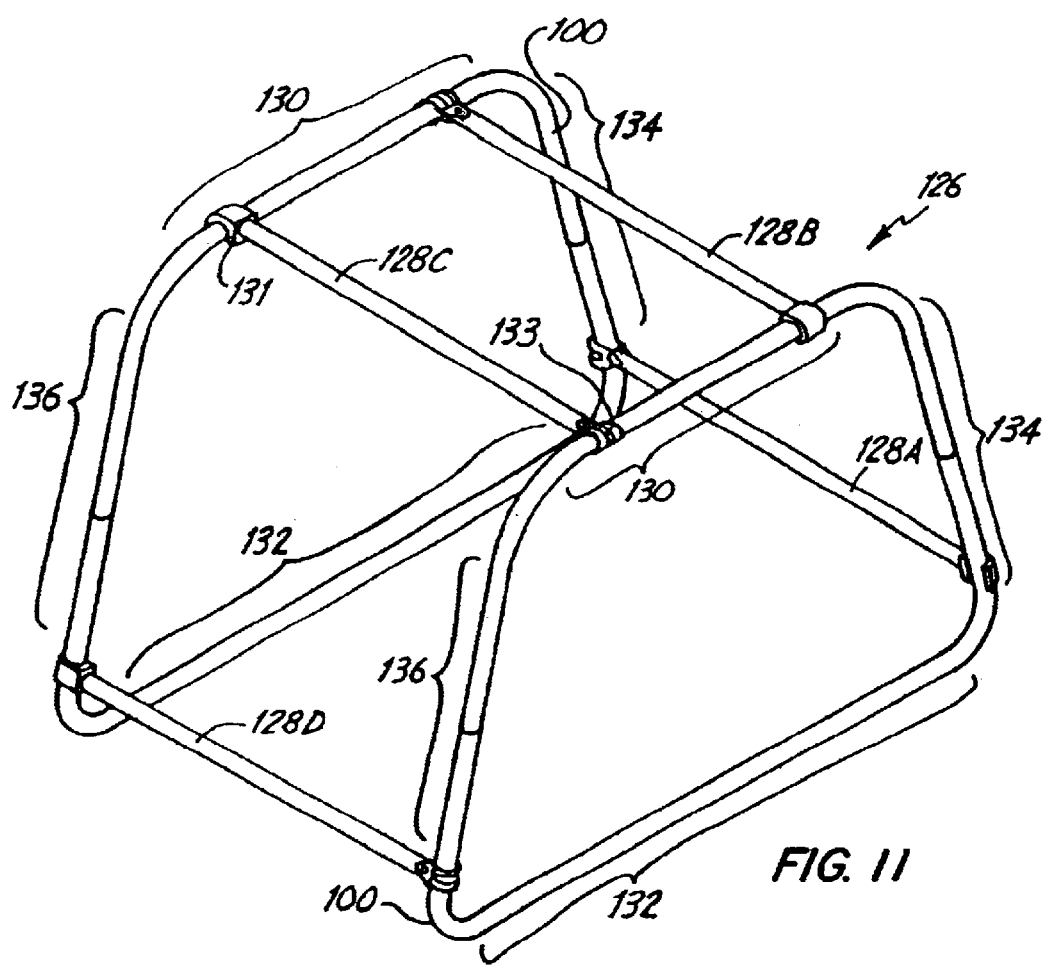
FIG. 11 is a perspective view of an alternative embodiment of assembled frame with the peripheral frame members of FIG. 10.

FIG. 11 is a perspective view of a frame 126 constructed from a pair of peripheral frame members 100 described in FIG. 10 for supporting a material enclosure of animal container 10. Each frame member 100 includes a top portion 130 and a bottom portion 132. Each frame member 100 includes a first vertical portion 134 and a second vertical portion 136. The top portion 130 and bottom portion 132, define a length of frame 126, while first vertical portion 134 and second vertical portion 136 define the height of frame 126. In one embodiment, the second vertical portion 136 is formed at an obtuse angle relative to top portion 130 to define a sloped appearance of frame 126.

The peripheral frame members 100 are held in a spaced relationship by a plurality of interconnecting cross-support members 128, each having the same length. Cross-support member 128A interconnects the first vertical portion 134 of the pair of frame members 100. Cross support members 128B and 128C interconnect the top portions 130 of frame members 100. Cross support member 128D interconnects the second vertical portion 136 of the pair of frame members 100. Cross support members 128A–128D define the width of frame 126.

Each cross support member 128 includes a fixed pivotal connection 131 and a reversible snap connection 133, which allows for easy assembly and disassembly of frame 126 and ready storage of cross support members 128A–128D when animal container 10 is not in use. In one exemplary embodiment, cross support members 128A–128D are made of a tubular metal, such as aluminum.

Figure 12:
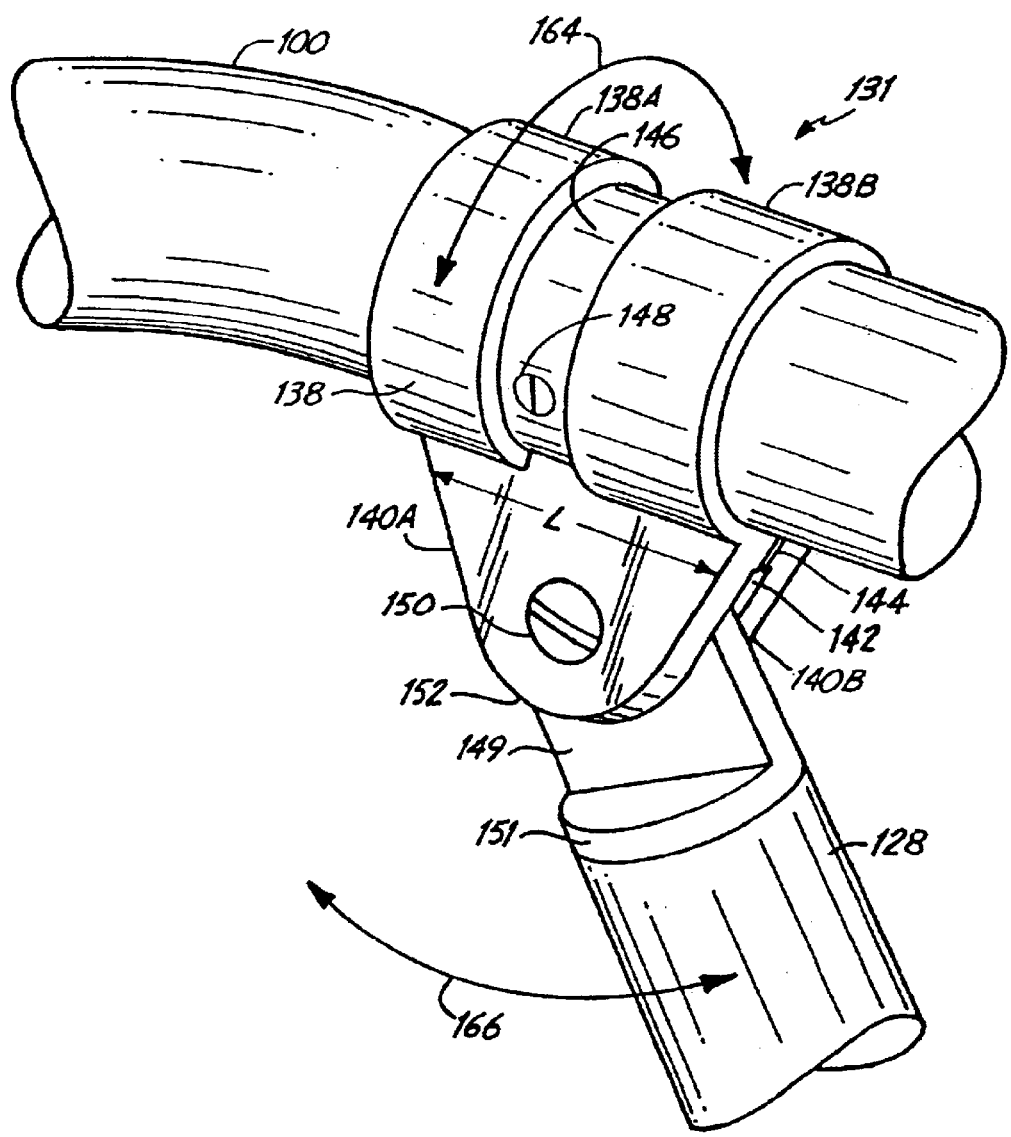
FIG. 12 is an enlarged view of a pivotal connection of a cross-support member to a peripheral frame member of FIG. 11.

FIG. 12 is an enlarged view of pivotal connection 131. As shown in FIG. 12, pivotal connection 131 is formed by connector 138. Connector 138 has first and second spaced collars 138A and 138B that are spaced by gap 146. Collars 138A and 138B, surround peripheral frame member 100 are connected to a pair of spaced walls 140A and 140B, which extend radially from one side of collars 138A, 138B. Spaced side walls 140A, 140B define a gap 142 for connection of cross support member 128. A narrow slit 144 further separates the spaced walls 140A, 140B along the length L of annular connector 138, from collar 138B to collar 138A. Slit 144 allows the spaced walls to be separated sufficient to increase the inner diameter of collars 138A, 138B for ease of sliding connector 138 along member 100 to its desired location. Once connector 138 is placed in its desired location, a screw 148 or its equivalent is placed into peripheral frame member 100 at gap 146 between collars 138A and 138B to restrict lateral and rotational movement, as shown by arrow 164, of connector 138. Screw 148 allows annular connector 138 to rotate upward so it can be in a parallel position with bottom wall 24, while preventing over-rotation of connector 138. Annular connector 138 allows for rotational movement of cross support member 126 relative to peripheral frame member 100.

Gap 142 between spaced side walls 140A and 140B allows for the insertion of flat male connector 149 into gap 142 and between side walls 140A and 140B. Flat male connector 149 extends form a tubular mounting portion 151, which is friction fit within the end of cross support member 128. Side walls 140A and 140B are rounded at point 152 to allow for ease of pivoting, as indicated by arrow 166. Male connector 148 is attached to side walls 140A and 140B via a screw 150 or its equivalent, which allows cross support member 128 to pivot in a plane common with side walls 140A, 140B. Annular connector 138 is preferably made of a hard, sturdy material such as plastic.

Figure 13:
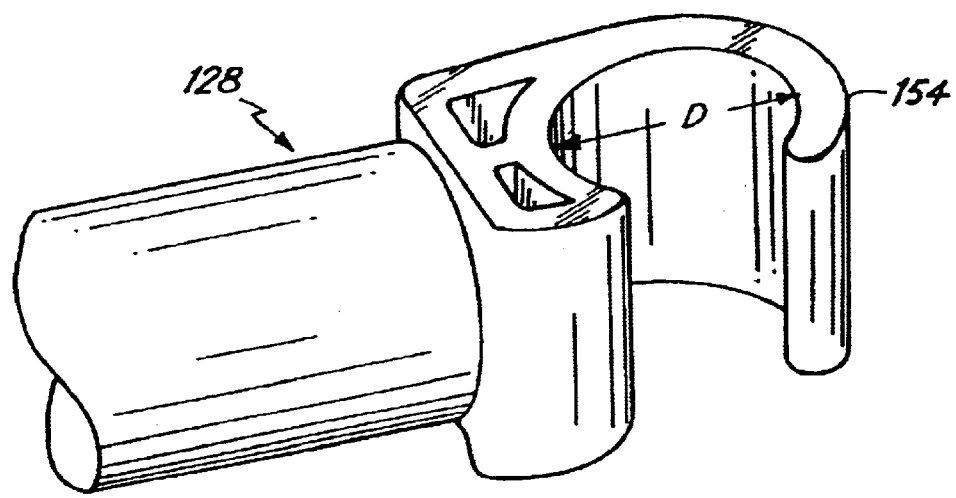
FIG. 13 is an enlarged view of a C-shaped connector of a cross-support member.

FIG. 13 is an enlarged view of the snap connection 133 formed by cross support member 128. Snap connection 133 is formed by C-shaped connector 154 that is attached to an end of the cross support member 128 opposite pivotal connection 130. The C-shaped connector 154 has an inner diameter D that is slightly smaller than the outer diameter of peripheral frame member 100 in order to allow for a snap fit with the C-shaped connector 154 and peripheral frame member 100. C-shaped connector 154 is made of a hard, sturdy material such as plastic.

Figure 14:
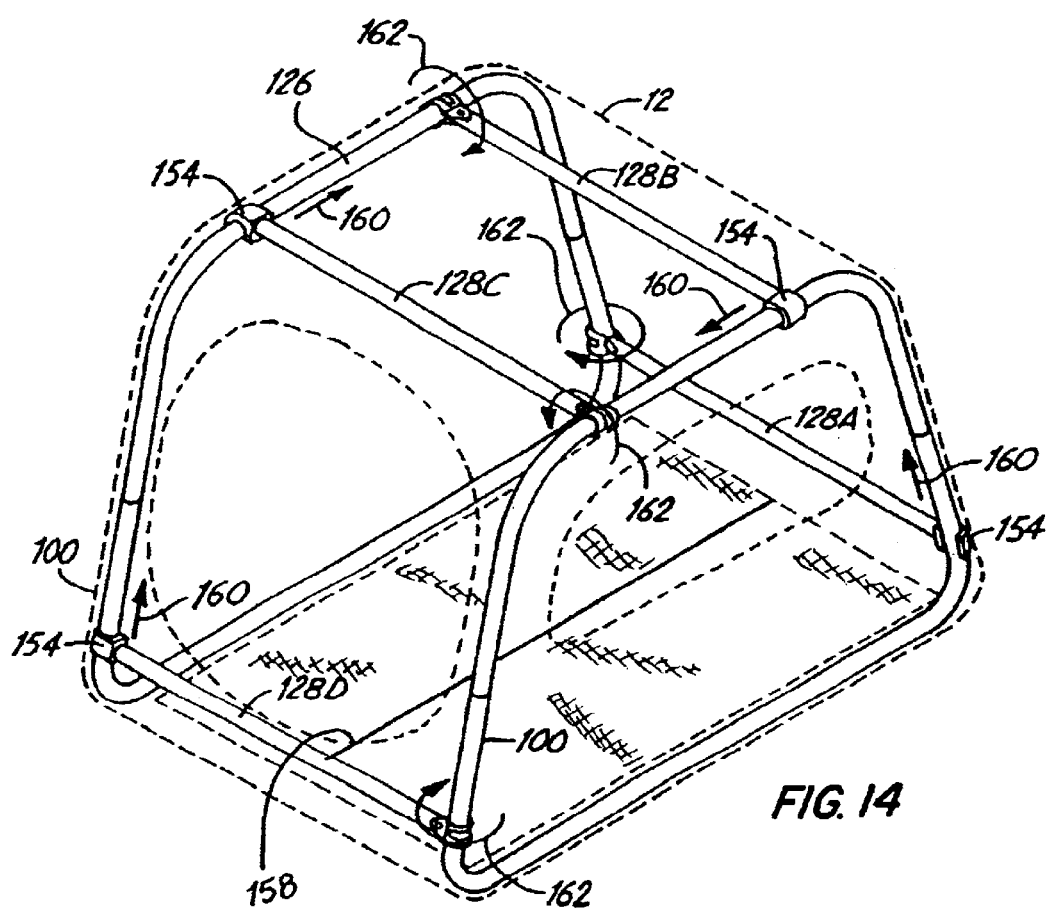
FIGS. 14–16 are perspective views of the animal container of FIG. 11 as it is being collapsed for storage.
Figure 15:
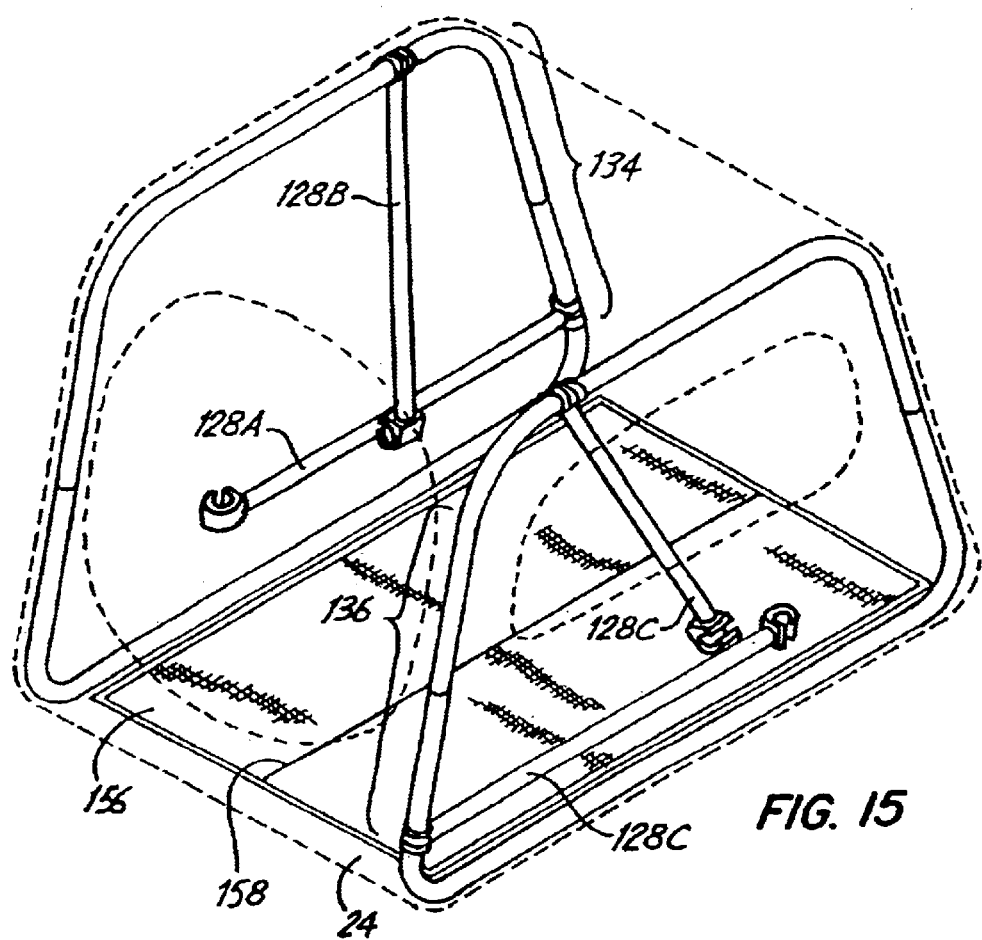
Figure 16:
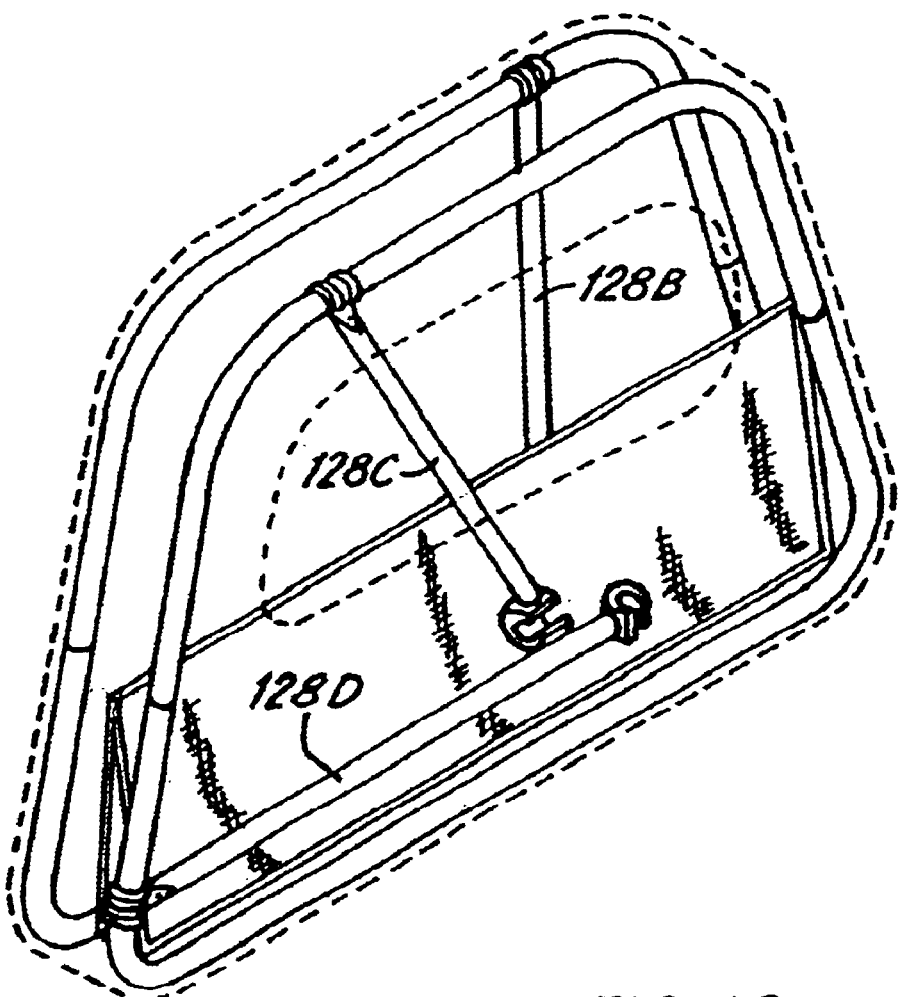

FIGS. 14–16 illustrate the process in which animal container 10 is converted from the open configuration to the collapsed configuration. As shown in FIG. 14 frame member 126 supports housing 12 (shown in phantom in the open configuration) and is preferably attached to top portion 130 and bottom portions 132 of peripheral frame members 100 by a plurality of hook and loop type fasteners (i.e., Velcro straps), similar to strut braces 34 shown in FIG. 8. Pad 156 which includes a medial seam 158 is attached to frame 126 via hook and loop type fasteners similar to the strut braces 34 shown in FIG. 8. To collapse animal container 10, C-shaped connector 154 of each cross support member 128A–128D is detached from the respective peripheral frame member 100. Each cross support member 128 is then pivoted about the connection of flat male connector 149 and walls 140A and 140B of connector 138, as indicated by arrows 160, until C-connector 154 is clear of peripheral frame member 100. Each cross support member 128 is then rotated about collars 138A and 138B, as indicated by arrows 162, to a storage position in a plane common with the respective peripheral frame member 100, as shown in FIG. 15.

Support members 128 are located on frame 126 in a staggered position with the pivotal connection 131 of support members 128A and 128B at or near vertical portion 134 of one of peripheral frame members 100 and pivotal connection 131 of support members 128C and 128D at or near vertical section 136 of the other peripheral frame member 100. This allows connectors 138 to pivot, rotate and allow support members 128 be stored in their respective positions without interference.

With cross members 128 in the storage position, housing 12 is collapsed by raising bottom wall 24 of housing 12 and causing pad 156 to fold along the medial seam 158. Peripheral frame members 100 are then brought together to place animal container 10 in a flat, easy to store, collapsed configuration, as shown in FIG. 16.

Although the present invention has been described with reference to preferred embodiments, workers skilled in the art will recognize that changes may be made in form and detail without departing from the spirit and scope of the invention.

What is claimed is:

1. A collapsible animal container, comprising:

(a) housing comprising a top wall, a bottom wall, a pair of sloping end walls, one of said end walls having a door therein, and a pair of side walls trapezoidal in shape, the housing formed from a flexible material;

(b) a pair of support members associated with the pair of sidewalls, the pair of support members defining a first and second dimension of the housing;

(c) a strut secured between the pair of support members, at least one strut defining a third dimension of the housing; and (d) wherein each support member of the pair of support members comprises a peripheral frame having the same peripheral shape as the abutting side wall.

2. The animal container of claim 1, wherein the housing comprises a door in at least one of the end walls, said one end wall sloping upwardly and inwardly from said bottom wall.

3. The animal container of claim 1, wherein the housing comprises at least one window in at least one of the side walls.

4. A collapsible animal container, comprising:

means for housing an animal including handles at an upper wall and an end wall having a door therein;

means for supporting the means for housing in a first and second dimension trapezoidal in shape; and removable means contacting the supporting means for biasing the supporting means in an open configuration.

5. A collapsible animal container comprising:

an enclosure having a pair of spaced side walls, the enclosure comprising a flexible material;

a support frame comprising a pair of peripheral supports that define a first and second dimension of the enclosure and a plurality of cross supports connected to the pair of peripheral supports that define a third dimension of the enclosure, the pair of peripheral supports being associated with and having the same peripheral share as the spaced side walls of the enclosure; and said enclosure having a bottom wall and front and rear walls, said first wall sloping upwardly toward said rear wall and having a door therein.

6. The animal container of claim 5, wherein the pair of peripheral supports comprise a pair of rigid frame members.

7. The animal container of claim 5, wherein at least one side wall of the enclosure comprises a window.

* * * * *

UNITED STATES PATENT AND TRADEMARK OFFICE
CERTIFICATE OF CORRECTION

PATENT NO. : 6,866,009 B2
DATED : March 15, 2005
INVENTOR(S) : Smith, Jr. et al.

It is certified that error appears in the above-identified patent and that said Letters Patent is hereby corrected as shown below:

<u>Title page,</u>
Item [63], Related U.S. Application Data, delete ", now Pat. No. 6,526,919".

<u>Column 1,</u>
Lines 6-7, delete ", now Pat. No. 6,526,919".

<u>Column 10,</u>
Line 15, "peripheral share as" should read -- peripheral shape as --.

Signed and Sealed this

Twenty-seventh Day of September, 2005

JON W. DUDAS
*Director of the United States Patent and Trademark Office*